(12) United States Patent
Hamamoto et al.

(10) Patent No.: US 7,652,215 B2
(45) Date of Patent: Jan. 26, 2010

(54) TARGET WEIGHT BALANCE THE SELECTS BETWEEN DIFFERENT WEIGHING METHODS AFTER THE DOOR HAS BEEN OPENED

(75) Inventors: Hiroshi Hamamoto, Kyoto (JP); Kunio Shimauchi, Kyoto (JP)

(73) Assignee: Shimadzu Corporation, Kyoto (JP)

(*) Notice: Subject to any disclaimer, the term of this patent is extended or adjusted under 35 U.S.C. 154(b) by 110 days.

(21) Appl. No.: 11/912,271

(22) PCT Filed: Apr. 17, 2006

(86) PCT No.: PCT/JP2006/308059
§ 371 (c)(1),
(2), (4) Date: Oct. 22, 2007

(87) PCT Pub. No.: WO2006/115098
PCT Pub. Date: Nov. 2, 2006

(65) Prior Publication Data
US 2009/0065264 A1      Mar. 12, 2009

(30) Foreign Application Priority Data
Apr. 25, 2005   (JP) .............................. 2005-127026

(51) Int. Cl.
G01G 23/37   (2006.01)

(52) U.S. Cl. ...................................... 177/180; 702/101

(58) Field of Classification Search ................. 177/180, 177/181; 702/101, 102
See application file for complete search history.

(56) References Cited

U.S. PATENT DOCUMENTS

| | | | | |
|---|---|---|---|---|
| 4,666,005 A | * | 5/1987 | Komoto et al. | 177/180 |
| 5,058,692 A | * | 10/1991 | Melcher et al. | 177/181 |
| 6,215,078 B1 | * | 4/2001 | Torres et al. | 177/25.15 |
| 6,794,586 B1 | * | 9/2004 | Mason | 177/25.15 |
| 2009/0020341 A1 | * | 1/2009 | Hamamoto et al. | 177/180 |

* cited by examiner

Primary Examiner—Randy W Gibson
(74) Attorney, Agent, or Firm—J.C. Patents

(57) ABSTRACT

To enhance the precision in balancing measurement, an electronic balance is provided. The electronic balance includes a door open/close detection sensor 3 for detecting the open/close of a door 52; a weighing precision setting unit, for setting a weighing precision; a calculation unit, for calculating an average time for balancing measurement that is as short as possible and satisfies the weighing precision or an average number of pieces of data; and a selection unit, for selecting an average time for weight measurement or an average number of pieces of data when the opening of the door 52 is detected by the sensor 3, and selecting an average time of normal measurement or an average number of pieces of data when the closing of the door 52 is detected by the sensor 3, and an averaging process is performed with the average time or the average number of pieces of data that is being selected.

2 Claims, 2 Drawing Sheets

TARGET WEIGHT BALANCE THE SELECTS BETWEEN DIFFERENT WEIGHING METHODS AFTER THE DOOR HAS BEEN OPENED

CROSS-REFERENCE TO RELATED APPLICATION

This application claims the priority benefit of PCT application serial no. PCT/JP2006/308059, filed Apr. 17, 2006, which claims Japanese patent application no. 2005-127026, filed Apr. 25, 2005. The entirety of each of the above-mentioned patent applications is incorporated herein by reference and made a part of this specification.

BACKGROUND OF THE INVENTION

1. Field of the Invention

The present invention relates to an electronic balance, preferably applicable for balancing measurement.

2. Description of Related Art

With regard to the purpose (method) of using an electronic balance, besides the method of measuring the weight of one (or a plurality of) blocks (hereinafter referred as "normal measurement"), there is also a method of weighing a predetermined amount of powder, liquid, etc (hereinafter referred as "balancing measurement").

Generally speaking, the measured weight may be smaller than the precision of the balance in the balancing measurement mode. However, the measurement time in the balancing measurement mode must be shortened. When the sample is weighted through the normal measurement mode after the balancing measurement mode, the precision of the measurement is more emphasized than a shortening of the measurement time.

Reference 1: Japan Patent Publication H10-19642.

In a conventional electronic balance, in order to display the calculated value steadily, the measurement data obtained at every second are averaged for each specified time period and the averaged measurement data is then displayed. However, the response cannot be simply accelerated or slowed down according to the above modes; in other words, the weighing precision or the minimum weight cannot be set according to a specific measurement, and thus an optimal measurement cannot be achieved.

SUMMARY OF THE INVENTION

Accordingly, the present invention is directed to an electronic balance, capable of setting a weighing precision or a minimum weight in advance, so as to perform the balancing measurement according to the setting conditions to thereby enhance the measurement precision.

As embodied and broadly described herein, the present invention provides an electronic balance, which is equipped with a windshield, applicable for averaging a load signal with an average time or an average number of pieces of data, so as to obtain a calculated value, wherein the windshield has an openable door surrounding a weighing pan. The electronic balance includes: a door open/close detection unit, for detecting the opening/closing of the door; a weighing precision setting unit, for setting a weighing precision; a calculation unit, for calculating an average time for weight measurement that satisfies the weighing precision or for calculating an average number of the pieces of data; and a selection unit, for selecting either an average time for the weight measurement or an average number of pieces of data when the opening of the door is detected by the door open/close detection unit, and selecting either an average time of a normal measurement or an average number of pieces of data when closing of the door is detected, wherein an averaging process is performed with either the average time or the average number of pieces of data that is being selected.

The present invention further provides an electronic balance, which is equipped with a windshield, applicable for averaging a load signal with an average time or an average number of pieces of data, so as to obtain a calculated value, in which the windshield has an openable door surrounding a weighing pan. The electronic balance includes: a door open/close detection unit, for detecting the opening/closing of the door; a weighing precision setting unit, for setting a minimum weight of a sample placed on the weighing pan during a balancing measurement; and a selection unit, for selecting an average time or an average number of pieces of data as a predetermined average time for the balancing measurement or a predetermined average number of pieces of data when the weight of the sample placed on the weighing pan is larger than the minimum weight and an opening of the door is detected by the door open/close detection unit. An averaging process is then performed with the average time or the average number of pieces of data that is being selected.

The above-mentioned electronic balance of the present invention further includes a weight precision setting unit, for setting a weighting precision; and a calculation unit, for calculating either an average time for the weight measurement that satisfies the weight precision or an average number of pieces of data; and the average time for weight measurement or the average number of pieces of data is calculated through the calculation unit.

Efficacy of the Invention

The electronic balance provided in the present invention is described above, and the electronic balance of the present invention is capable of setting a weighing precision or a minimum weight in advance, so as to perform the balancing measurement according to the setting conditions; thus, the precision of balancing measurement is enhanced. Therefore, during the balancing measurement, precision can be anticipated without wasting time on unnecessary averaging process; hence, the operation efficiency is improved.

In order to make the aforementioned and other objects, features, and advantages of the present invention comprehensible, embodiments accompanied with figures are described in detail below.

It is to be understood that both the foregoing general description and the following detailed description are exemplary, and are intended to provide further explanation of the invention as claimed.

GENERAL DESCRIPTION OF THE DRAWINGS

DESCRIPTION OF EMBODIMENTS

Figure 1:
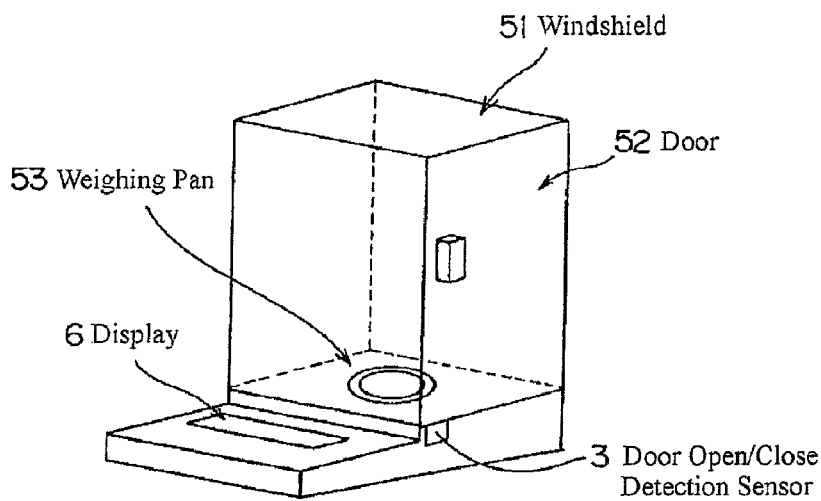
FIG. 1 is a general appearance diagram of an electronic balance equipped with a windshield according to the present invention.

Hereinafter, an electronic balance provided in the present invention is illustrated below through the embodiments shown in FIGS. 1 to 4. FIG. 1 is a general appearance diagram of an electronic balance equipped with a windshield according to the present invention, FIG. 2 is a general structure diagram of an electronic balance equipped with a windshield according to the present invention, FIG. 3 is a general diagram of processing functions of an electronic balance equipped with a windshield according to the present invention, and FIG. 4 is a flow chart of the processing of the electronic balance equipped with a windshield according to the present invention.

Figure 2:
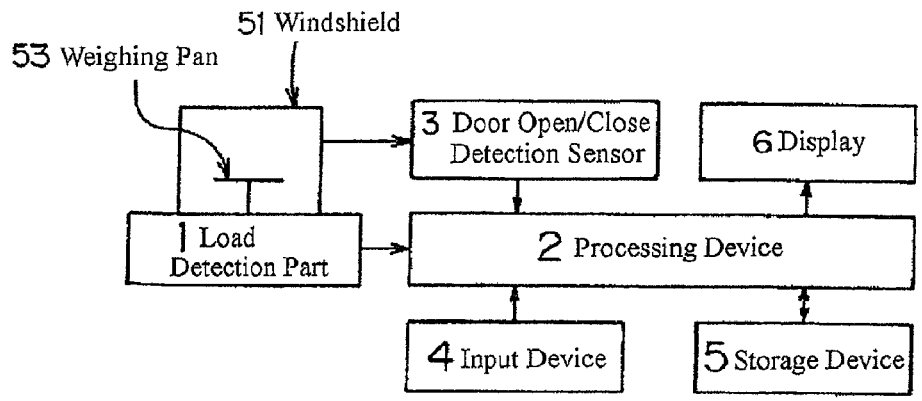
FIG. 2 is a general structure diagram of the electronic balance equipped with a windshield according to the present invention.

Referring to FIGS. 1 and 2, the general structure of the electronic balance is illustrated, wherein a weighing pan 53 for carrying a sample is disposed on a load detection part 1 and is encased by a windshield 51. A door 52 is disposed in the windshield 51, and a display 6 is used for displaying the calculated value.

The load detection part 1 is connected to a processing device 2, and a weight precision (e.g., weight values such as 1 mg, 0.1 mg, and 0.01 mg, or a weight figure to be accurately read) or a minimum weight (e.g., the weight for the normal measurement is larger than or equal to 2 mg) is input via an input device 4, such as an external input devices, including a key switch, a personal computer, or an external keyboard etc. that are connected with the processing device 2, and then stored into a storage device 5 through the processing device 2. The display 6 displays a calculated value obtained by converting the weight value of the load detected by the load detection part 1. Both or either one of the weighing precision and the minimum weight can be set to be inputted in the configuration.

Figure 3:
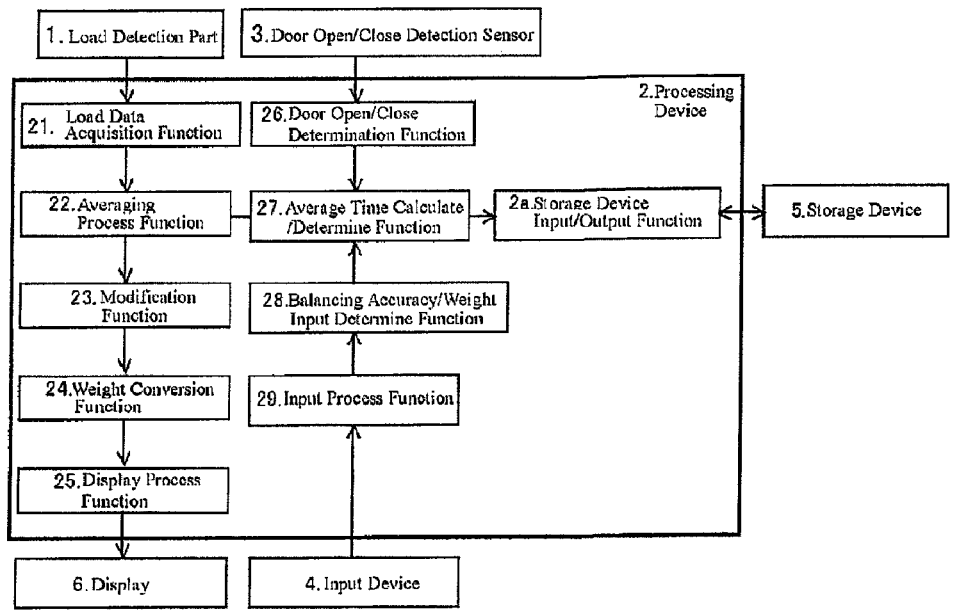
FIG. 3 is a general diagram of processing functions of the electronic balance equipped with a windshield according to the present invention.
Figure 4:
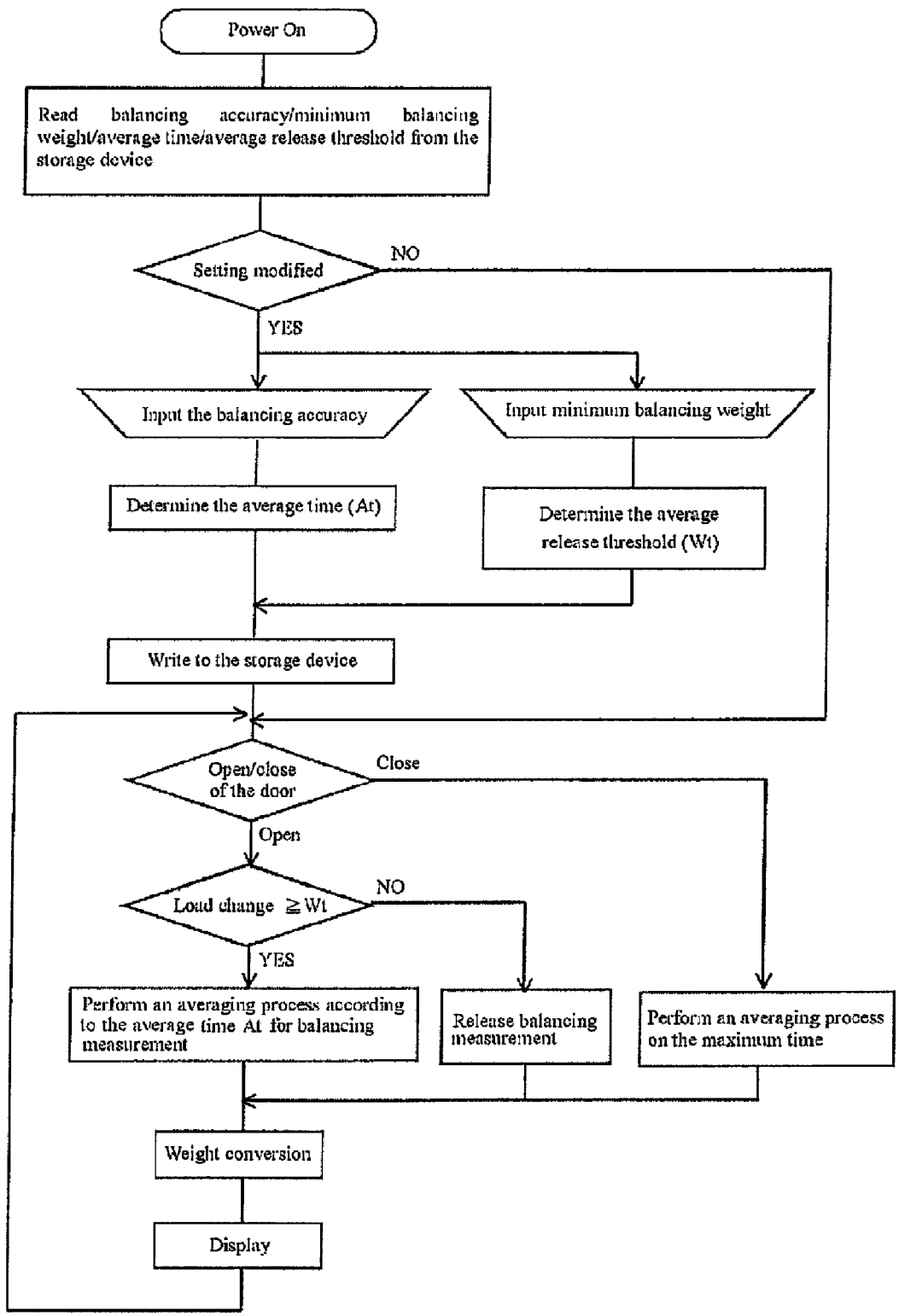
FIG. 4 is a flow chart of the processing of the electronic balance equipped with a windshield according to the present invention.

Referring to FIGS. 3 and 4, the operations of this embodiment are illustrated. First of all, the user inputs a weighing precision required in the weighing operation from the input device 4. Moreover, the minimum weight is also inputted. Both or either one of the above data can be inputted. The inputted data passes through an input process function 29 and is digitalized by a weighing precision/weight input determine function 28, and is then transmitted to an average time calculation/determination function 27. Moreover, the inputted data passes through a storage device input/output function 2a and is stored into the storage device 5.

The average time calculation/determination function 27 is used to calculate and determine an average number of pieces of data or an average time for obtaining the required weighing precision. The average number of the pieces of data or the average time may be stored into the storage device 5 through the storage device input/output function 2a.

During a practical weighing operation, the door 52 of the windshield 51 is opened, and the operation is conducted with the door 52 left open. When a door open/close determination function 26 determines that the door 52 is opened, it is referred as a balancing measurement mode. If the weighing precision is relatively low, the display response is speeded up by the average time that is relatively short and is determined by the average time calculate/determine function 27. On the other hand, if the weighing precision is relatively high, the display response is stabilized by the average time that is relatively long and is determined by the average time calculation/determination function 27.

Moreover, after the averaging process performed by an averaging process function 22, a span modification is performed through a modification function 23, the conversion to a calculated value is performed through a weight conversion function 24, and the converted calculation value is outputted into the display 6 through a display process function 25.

After the balancing measurement operation is finished, and if the door open/close determination function 26 determines that the door 52 of the windshield 52 is closed, the average time is prolonged. However, the weighing precision is not at all affected, so as to stabilize the display; thus, the user is informed with a highly reliable measured value.

Moreover, when the door 52 is open, and if a load higher than the set value of the minimum weight is placed on the weighing pan 53, it is referred as a balancing measurement mode. Under this measurement mode, an averaging process is performed with the predetermined average time for the balancing measurement or predetermined average number of pieces of data or with the average time for balancing measurement or average number of pieces of data determined by the average time calculation/determination function 27, so as to accelerate the display response. Once the door 52 is closed, the balancing measurement mode is released, and the average time is prolonged, so as to stabilize the display; thus, a weight value with a higher reliability is informed to the user.

Though the present invention has been disclosed above by the preferred embodiments, they are not intended to limit the present invention. Anybody skilled in the art can make some modifications and variations without departing from the spirit and scope of the present invention. Therefore, the protecting range of the present invention falls in the appended claims and their equivalents.

What is claimed is:

1. An electronic balance, equipped with a windshield, the electronic balance is applicable for averaging a load signal by using an average time or an average number of pieces of data to obtain a measurement value, wherein the windshield has an openable door surrounding a weighing pan, the electronic balance is characterized in comprising:

a door open/close detection unit, for detecting an opening or a closing of the door;

a target weight setting unit, for setting a minimum target weight of a sample placed on the weighing pan during a balancing measurement, wherein the balancing measurement is for measuring the sample, in which the minimum target weight has been set; and a selection unit, for selecting the average time or the average number of pieces of data as a predetermined average time or a predetermined average number of pieces of data for the balancing measurement when a weight of the sample placed on the weighing pan is larger than the minimum target and the opening of the door is detected by the door open/close detection unit, wherein an averaging process is performed by using the average time or the average number of pieces of data that has being selected.

2. The electronic balance as claimed in claim 1, comprising:

a balancing accuracy setting unit, for setting a balancing accuracy; and a calculation unit, for calculating the average time or the average number of the pieces of data for the balancing measurement to satisfy the balancing accuracy; wherein the average time or the average number of pieces of data for the balancing measurement is calculated through the calculation unit.

* * * * *